US010462704B2

(12) United States Patent
Rasanen (10) Patent No.: US 10,462,704 B2
(45) Date of Patent: Oct. 29, 2019

(54) METHOD, APPARATUS AND SYSTEM (71) Applicant: NOKIA SOLUTIONS AND NETWORKS OY, Espoo (FI)

(72) Inventor: Juha Antero Rasanen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 162 days.

(21) Appl. No.: 15/306,828

(22) PCT Filed: Apr. 30, 2014

(86) PCT No.: PCT/EP2014/058917
§ 371 (c)(1),
(2) Date: Oct. 26, 2016

(87) PCT Pub. No.: WO2015/165540
PCT Pub. Date: Nov. 5, 2015

(65) Prior Publication Data
US 2017/0048751 A1 Feb. 16, 2017

(51) Int. Cl.
H04W 28/08 (2009.01)
H04W 8/22 (2009.01)
H04W 8/20 (2009.01)
H04W 8/24 (2009.01)
H04W 28/02 (2009.01)

(52) U.S. Cl.
CPC ........... *H04W 28/085* (2013.01); *H04W 8/20* (2013.01); *H04W 8/22* (2013.01); *H04W 8/24* (2013.01); *H04W 28/0268* (2013.01)

(58) Field of Classification Search
None
See application file for complete search history.

(56) References Cited

U.S. PATENT DOCUMENTS

| 8,605,655 B1* | 12/2013 | Sahai ................. H04M 15/66 370/328 |
| 9,642,032 B2* | 5/2017 | Berzin .............. H04W 28/0252 |
| 9,974,099 B2* | 5/2018 | Sivanesan ............ H04L 5/0032 |
| 2009/0286543 A1* | 11/2009 | Nath .................... H04W 88/06 455/445 |
| 2013/0003566 A1* | 1/2013 | Munoz de la Torre Alonso ........ H04W 76/22 370/252 |
| 2015/0009826 A1* | 1/2015 | Ma .................... H04W 28/0268 370/235 |
| 2015/0092707 A1* | 4/2015 | Kwon ................... H04W 76/38 370/329 |

(Continued)

FOREIGN PATENT DOCUMENTS

WO  WO 2012/036789 A1  3/2012

OTHER PUBLICATIONS

International Search Report dated Jan. 28, 2015 corresponding to International Patent Application No. PCT/EP2014/058917.

*Primary Examiner* — Afsar M Qureshi
(74) *Attorney, Agent, or Firm* — Squire Patton Boggs (US) LLP (57) ABSTRACT There is provided a method comprising determining a bearer to be used for first traffic between a user equipment and one of a plurality of base stations in dependence on information indicating the user equipment's ability to communicate with a plurality of base stations, policy rules, and information about the application characteristics of said first traffic.

17 Claims, 5 Drawing Sheets (56) References Cited

U.S. PATENT DOCUMENTS

| | | | |
|---|---|---|---|
| 2016/0156676 A1* | 6/2016 | Verin | H04L 65/1016 |
| | | | 709/228 |
| 2016/0219604 A1* | 7/2016 | Fujishiro | H04W 72/085 |
| 2016/0338132 A1* | 11/2016 | Uchino | H04W 28/08 |
| 2017/0012822 A1* | 1/2017 | Zhang | H04L 12/6418 |
| 2017/0019945 A1* | 1/2017 | Chiba | H04W 74/0833 |
| 2017/0105128 A1* | 4/2017 | Chiba | H04W 24/02 |
| 2017/0181216 A1* | 6/2017 | Worrall | H04W 76/15 |
| 2018/0013695 A1* | 1/2018 | Kakadia | H04L 47/824 |
| 2018/0077600 A1* | 3/2018 | Feuersaenger | H04W 72/1268 |

\* cited by examiner

Determining a bearer to be used for first traffic between a user equipment and one of a plurality of base stations in dependence on information indicating the user equipment's ability to communicate with a plurality of base stations, policy rules, and information about the application characteristics of said first traffic

METHOD, APPARATUS AND SYSTEM

The present application relates to a method, apparatus and system and in particular but not exclusively, to small cell enhancements.

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the $3^{rd}$ Generation Partnership Project (3GPP). The various development stages of the 3GPP LTE specifications are referred to as releases. An aim of the standardization may be to achieve a communication system with, inter alia, reduced latency, higher user data rates, improved system capacity and coverage, and reduced cost for the operator.

In a first aspect there is provided a method comprising determining a bearer to be used for first traffic between a user equipment and one of a plurality of base stations in dependence on information indicating the user equipment's ability to communicate with a plurality of base stations, policy rules, and information about the application characteristics of said first traffic.

The method may comprise receiving the information indicating the user equipment's ability to communicate with a plurality of base stations.

The information may be received from a mobility management entity and/or a first base station. The first base station may be a master base station.

The method may comprise causing the information indicating the user equipment's ability to communicate with a plurality of base stations to be sent to a first functional entity.

The first functional entity may be a policy and charging rules function.

The method may comprise receiving the policy rules from the first functional entity, the policy rules being dependent on the information indicating the user equipment's ability to communicate with a plurality of base stations.

The policy rules may be dependent on a user subscription profile.

The policy rules may comprise at least one of QoS control rules and charging control rules.

The bearer may be a dedicated non-guaranteed bit rate bearer.

The method may comprise receiving information about the application characteristics of said first traffic of said user equipment from a second functional entity.

The second functional entity may be a traffic detection function.

The information indicating the user equipment's ability to communicate with a plurality of base stations may comprise characteristics of the plurality of base stations.

The method may comprise receiving information using a bearer modification request message.

The plurality of base stations may comprise a master base station and a secondary base station.

The method may comprise requesting the establishment of the bearer.

The method may comprise determining on which of the plurality of base stations the bearer should be established.

The method may comprise determining which of an existing bearer is to be used for the first traffic.

The method may comprise causing information indicating the determined bearer to be sent to a radio network.

In a second aspect there is provided a method comprising receiving information indicating a user equipment's ability to communicate with a plurality of base stations, determining policy rules being dependent on the information indicating the user equipment's ability to communicate with a plurality of base stations and causing the policy rules to be sent to a functional entity.

The functional entity may be a policy and charging enforcement function.

In a third aspect there is provided a method comprising receiving information indicating a determined bearer to be used for first traffic between a user equipment and one of a plurality of base stations, the bearer determined in dependence on information indicating the user equipment's ability to communicate with a plurality of base stations, policy rules, and information about the application characteristics of said first traffic.

In a fourth aspect there is provided an apparatus comprising means for determining a bearer to be used for first traffic between a user equipment and one of a plurality of base stations in dependence on information indicating the user equipment's ability to communicate with a plurality of base stations, policy rules, and information about the application characteristics of said first traffic.

The apparatus may comprise means for receiving the information indicating the user equipment's ability to communicate with a plurality of base stations.

The information may be received from a mobility management entity and/or a first base station. The first base station may be a master base station.

The apparatus may comprise means for causing the information indicating the user equipment's ability to communicate with a plurality of base stations to be sent to a first functional entity.

The first functional entity may be a policy and charging rules function.

The apparatus may comprise means for receiving the policy rules from the first functional entity, the policy rules being dependent on the information indicating the user equipment's ability to communicate with a plurality of base stations.

The policy rules may be dependent on a user subscription profile.

The policy rules may comprise at least one of QoS control rules and charging control rules.

The bearer may be a dedicated non-guaranteed bit rate bearer.

The apparatus may comprise means for receiving information about the application characteristics of said first traffic of said user equipment from a second functional entity.

The second functional entity may be a traffic detection function.

The information indicating the user equipment's ability to communicate with a plurality of base stations may comprise characteristics of the plurality of base stations.

The apparatus may comprise means for receiving information using a bearer modification request message.

The plurality of base stations may comprise a master base station and a secondary base station.

The apparatus may comprise means for requesting the establishment of the bearer.

The apparatus may comprise means for determining on which of the plurality of base stations the bearer should be established.

The apparatus may comprise means for determining which of an existing bearer is to be used for the first traffic.

The apparatus may comprise means for causing information indicating the determined bearer to be sent to a radio network.

In a fifth aspect there is provided an apparatus comprising means for receiving information indicating a user equipment's ability to communicate with a plurality of base stations, means for determining policy rules being dependent on the information indicating the user equipment's ability to communicate with a plurality of base stations and means for causing the policy rules to be sent to a functional entity.

The functional entity may be a policy and charging enforcement function.

In a sixth aspect there is provided an apparatus comprising means for receiving information indicating a determined bearer to be used for first traffic between a user equipment and one of a plurality of base stations, the bearer determined in dependence on information indicating the user equipment's ability to communicate with a plurality of base stations, policy rules, and information about the application characteristics of said first traffic.

In a seventh aspect there is provided an apparatus, said apparatus comprising at least one processor and at least one memory including computer code for one or more programs, the at least one memory and the computer code configured, with the at least one processor, to cause the apparatus at least to determine a bearer to be used for first traffic between a user equipment and one of a plurality of base stations in dependence on information indicating the user equipment's ability to communicate with a plurality of base stations, policy rules, and information about the application characteristics of said first traffic.

The at least one memory and the computer code may be configured, with the at least one processor to cause the apparatus to receive the information indicating the user equipment's ability to communicate with a plurality of base stations.

The information may be received from a mobility management entity and/or a first base station. The first base station may be a master base station.

The at least one memory and the computer code may be configured, with the at least one processor to cause the apparatus to cause the information indicating the user equipment's ability to communicate with a plurality of base stations to be sent to a first functional entity.

The first functional entity may be a policy and charging rules function.

The at least one memory and the computer code may be configured, with the at least one processor to cause the apparatus to receive the policy rules from the first functional entity, the policy rules being dependent on the information indicating the user equipment's ability to communicate with a plurality of base stations.

The policy rules may be dependent on a user subscription profile.

The policy rules may comprise at least one of QoS control rules and charging control rules.

The bearer may be a dedicated non-guaranteed bit rate bearer.

The at least one memory and the computer code may be configured, with the at least one processor to cause the apparatus to receive information about the application characteristics of said first traffic of said user equipment from a second functional entity.

The second functional entity may be a traffic detection function.

The information indicating the user equipment's ability to communicate with a plurality of base stations may comprise characteristics of the plurality of base stations.

The at least one memory and the computer code may be configured, with the at least one processor to cause the apparatus to receive information using a bearer modification request message.

The plurality of base stations may comprise a master base station and a secondary base station.

The at least one memory and the computer code may be configured, with the at least one processor to cause the apparatus to request the establishment of the bearer.

The at least one memory and the computer code may be configured, with the at least one processor to cause the apparatus to determine on which of the plurality of base stations the bearer should be established.

The at least one memory and the computer code may be configured, with the at least one processor to cause the apparatus to determine which of an existing bearer is to be used for the first traffic.

The at least one memory and the computer code may be configured, with the at least one processor to cause the apparatus to cause information indicating the determined bearer to be sent to a radio network.

In an eighth aspect there is provided an apparatus, said apparatus comprising at least one processor and at least one memory including computer code for one or more programs, the at least one memory and the computer code configured, with the at least one processor, to cause the apparatus at least to receive information indicating a user equipment's ability to communicate with a plurality of base stations, means for determining policy rules being dependent on the information indicating the user equipment's ability to communicate with a plurality of base stations and means for causing the policy rules to be sent to a functional entity.

The functional entity may be a policy and charging enforcement function.

In a ninth aspect there is provided an apparatus, said apparatus comprising at least one processor and at least one memory including computer code for one or more programs, the at least one memory and the computer code configured, with the at least one processor, to cause the apparatus at least to receive information indicating a determined bearer to be used for first traffic between a user equipment and one of a plurality of base stations, the bearer determined in dependence on information indicating the user equipment's ability to communicate with a plurality of base stations, policy rules, and information about the application characteristics of said first traffic.

In a tenth aspect there is provided a computer program comprising computer executable instructions which when run are configured to perform the methods described above.

In the above, many different embodiments have been described. It should be appreciated that further embodiments may be provided by the combination of any two or more of the embodiments described above.

Embodiments will now be described, by way of example only, with reference to the accompanying Figures in which.

Before explaining in detail the examples, certain general principles of a wireless communication system and mobile communication devices are briefly explained with reference to FIGS. 1 to 2 to assist in understanding the technology underlying the described examples.

Figure 1:
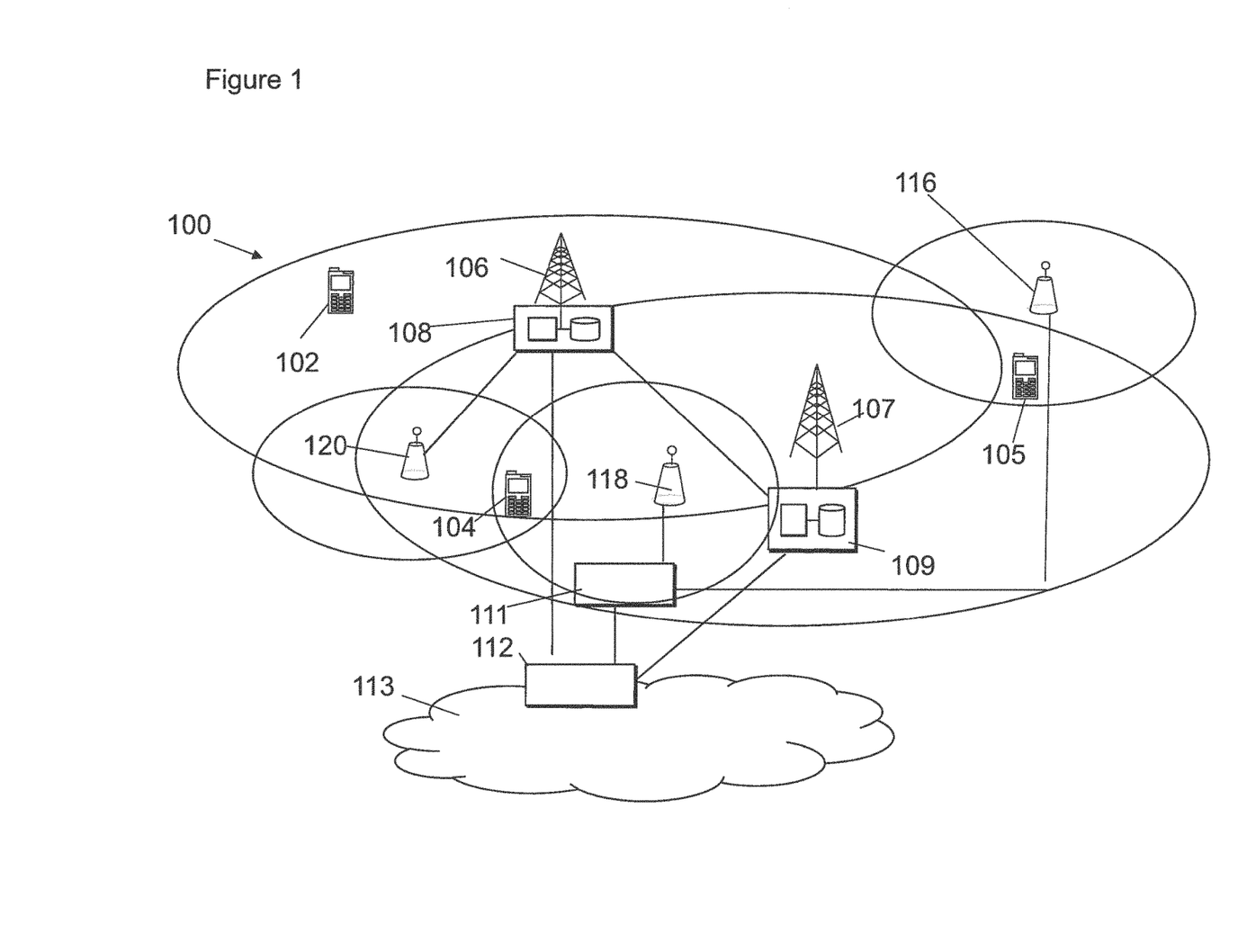
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
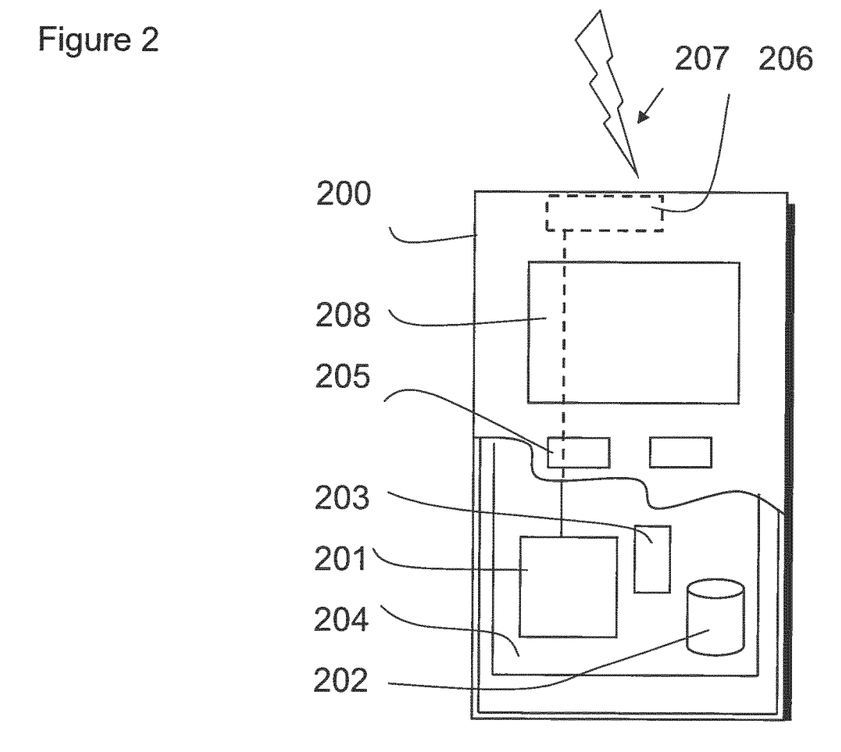
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). A base station can provide coverage for an entire cell or similar radio service area.

Cells can provide different service areas. For example, some cells may provide wide coverage areas while some other cells provide smaller coverage areas. The smaller radio coverage areas can be located wholly or partially within a larger radio coverage area. For example, in LTE a node providing a relatively wide coverage area is referred to as a macro eNode B. Examples of nodes providing smaller cells, or local radio service areas, include femto nodes such as Home eNBs (HeNB), pico nodes such as pico eNodeBs (pico-eNB) and remote radio heads.

A device may communicate with more than one cell. Communications with more than one cell may be provided e.g. to increase performance. Dual connectivity may be provided where a user device is configured to communicate with two base stations, for example, with both with a master eNB (MeNB) and a secondary eNB (SeNB). Communication with more than two base stations may be possible.

When dual connectivity is used, it is useful for a decision making entity to have appropriate criteria and information to decide which service flows, or bearers, to keep on the MeNB and which to hand off or off-load to the SeNB. This is particularly useful for applications and/or services that may use non-GBR (i.e. non-guaranteed bit rate) bearers for their packet traffic, which may otherwise be served by the default bearer because the decision making entity cannot perceive any difference between the applications/services.

Figure 3:
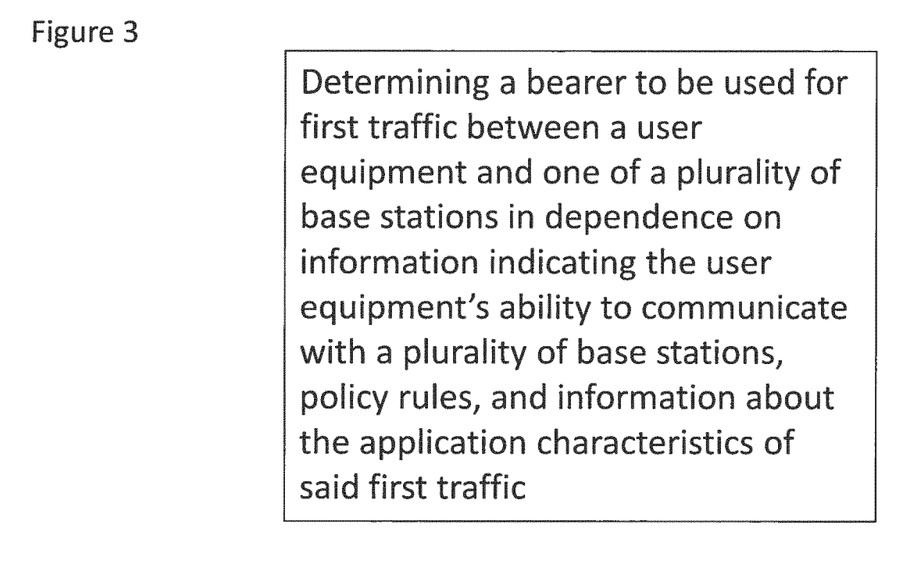
FIG. 3 shows an example flowchart of a method according to some embodiments.

In the method shown in FIG. 3, a decision making entity determines a bearer to be used for first traffic between a user equipment and one of a plurality of base stations in dependence on information indicating the user equipment's ability to communicate with a plurality of base stations, policy rules, and information about the application characteristics of said first traffic. The decision making entity may be a packet core network node, such as a P-GW. The P-GW may comprise the Policy and Charging Enforcement Function (PCEF). A base station, for example a MeNB, may inform the decision making entity about the dual connectivity of the UE or of the possibility of dual connectivity for the UE, when the base station becomes aware of the dual connectivity of the UE, or of the possibility of dual connectivity for the UE. The dual connectivity information may, as a minimum, comprise the types of the available eNBs (e.g. MeNB and SeNB), but may contain more detailed classification and properties, when applicable to the available eNBs.

The network node may include the eNB related information in the authorization request sent to a functional entity such as a Policy and Charging Rules Function (PCRF) to allow the PCRF to use the information for a policy decision and authorization of the request. The authorisation request may be a request for Policy and Charging Control (PCC) rules. PCC rules may comprise one or more of the following, detection of a packet belonging to service or application data flow, identification of the service the service data flow contributes to and providing applicable charging parameters, QoS (quality of service) parameters and policy control for a service data flow or any other suitable conditions.

The PCRF may receive eNB related authorization information with a subscription profile from one or more of the Subscription Profile Repository (SPR) or User data repository (UDR) or any other suitable entity. The PCRF may use the information for a policy decision and authorization of the request and/or to determine which eNB(s) is/are authorized to be used by a UE. The policy decision made by the PCRF may be sent to the PCEF or P-GW. The policy decision may comprise determining the PCC rules to define one or more of QoS (quality of service), charging characteristics for the service data flows of the UE, determining which eNB(s) is/are authorized to be used by a UE and any other suitable parameters. The PCRF may send the PCC rules to the PCEF. The PCEF may use the rules itself to define one or more of QoS and charging characteristics, gating and redirection or other suitable characteristics. PCEF may also "translate" QoS parameters for the bearer level and send them to the radio network and UE to be used by them.

A functional entity such as a Traffic Detection Function (TDF) detects an application/service and may inform the first decision making entity, for example the PCEF or PCRF (as further explained below), about the type of traffic of the detected application/service or other characteristics of the traffic of the detected application/service.

The PCEF uses the traffic information and/or the eNB related dual connectivity information received earlier from the radio network and/or a policy decision received from the PCRF to decide on whether to establish a dedicated bearer (or bearers) for the application/service traffic flow(s) and/or whether to use one or more existing bearer at least for one application/service flow. The TDF may be integrated with the PCEF in the P-GW or may be a standalone unit or integrated with another entity. If the TDF is a standalone unit or integrated with another entity, it may inform the PCEF about the detected application/service via the PCRF.

For example, because of the better match between the characteristics of the detected application/service and one of the available eNB types, the PCEF may establish a dedicated non-GBR bearer, and/or use an already existing dedicated bearer, for traffic flow(s) even though normally (i.e. without a dual connectivity) the flows would have been routed to the default bearer.

When requesting the establishment of the bearer, or when using an already existing bearer, the PCEF may send information relating to characteristics of the detected application/service and/or an indication of which eNB type is preferred or should be used for the bearer and/or related QoS information, to the radio network, for example to the MeNB.

The radio network may use the information received from the network node for making a decision on which eNB type the bearer should established on/routed via (e.g. via MeNB or SeNB) or whether an existing bearer should be handed off to another eNB. The other eNB may have similar or different characteristics from the eNB the bearer is currently on.

Figure 4:
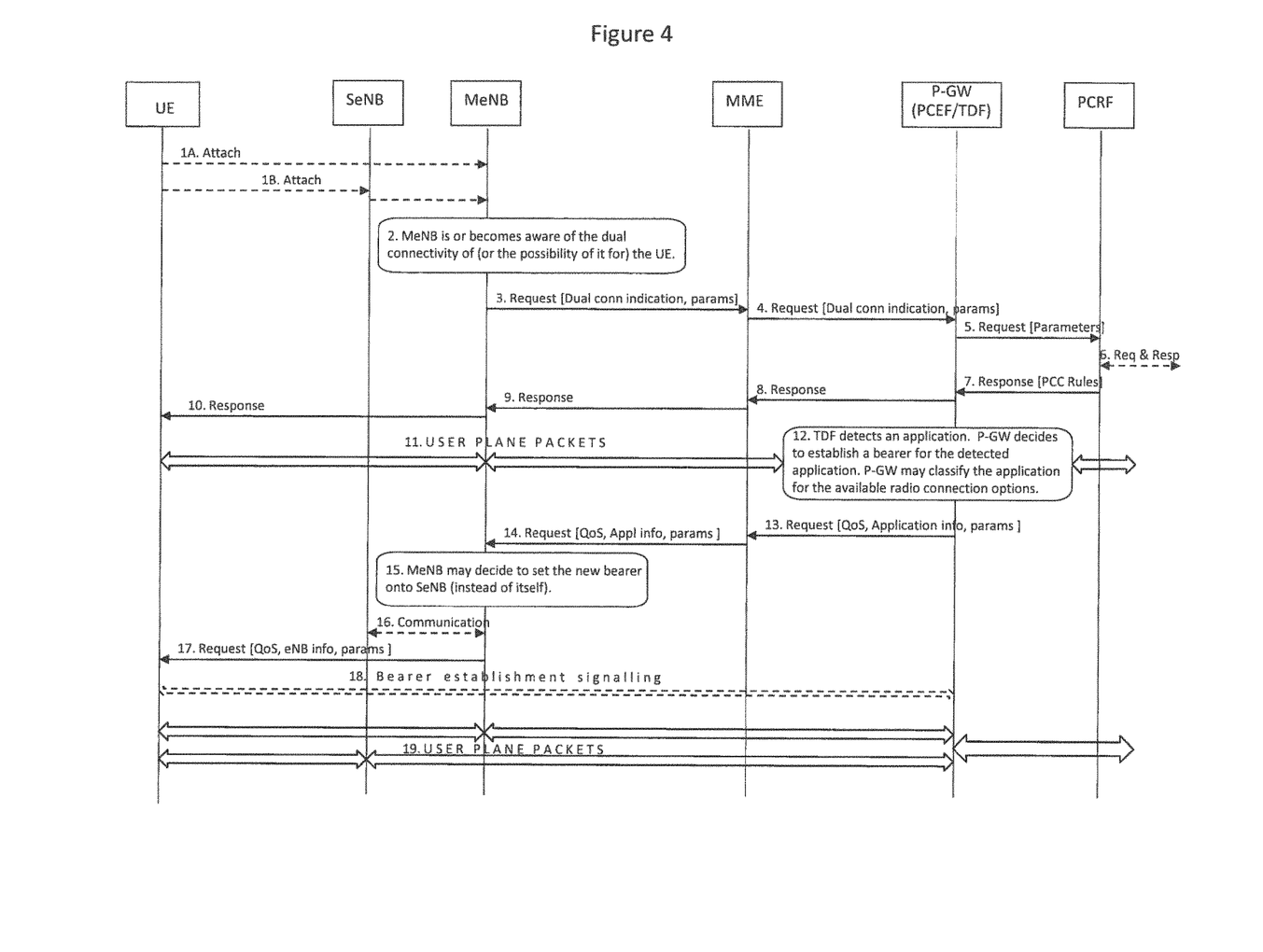
FIG. 4 shows a signalling diagram of a method according to some embodiments.

An exemplary signalling scenario for carrying out the method shown in FIG. 3 is shown in FIG. 4.

In steps 1A and 1B the UE establishes a connection via the MeNB and SeNB, i.e. a dual connection is made available.

In step 2, the MeNB is, or becomes, aware of the dual connectivity of (or the possibility of it for) the UE.

In step 3, the MeNB informs the MME about the dual connectivity and possibly about the characteristics of the available eNBs. The MeNB may inform the MME of dual connectivity information using a bearer modification request message.

In step 4, the MME informs the PCEF about the dual connectivity and possibly about the characteristics of the available eNBs, e.g. using a bearer modification request message.

In step 5, the PCEF requests authorization from the PCRF. The request may contain information about characteristics of available eNBs.

In step 6, the PCRF may receive the user's subscription profile from the SPR/UDR.

In step 7, the PCRF sends a response with Policy and Charging Control (PCC) rules to the PCEF.

In step 8, the PCEF may send a response to the MME.

In step 9, the MME may send a response to the MeNB.

In step 10, the MeNB may send a response to the UE.

In step 11, user data packets are transferred on the traffic plane.

In step 12, the TDF detects user data packets of an application/service and informs the PCEF about the detected application/service. The PCEF uses the type/characteristics of the detected application of the packet traffic and/or the eNB related information received earlier from the radio network and/or the decision received from the PCRF to decide on whether to establish a dedicated bearer (or bearers) for the application/service traffic flow(s).

In step 13, the PCEF requests the establishment of a bearer or indicates the use of an existing bearer. The request may contain information related to the detected application/service and/or an indication of which eNB type is preferred or should be used for the bearer and/or related QoS information.

In step 14, the MME may send the request further to MeNB.

In step 15, the MeNB may use the information received from the PCEF for making a decision to establish a bearer or to use an existing bearer and a decision on which eNB type the bearer should be established on and/or routed via (e.g. via MeNB or SeNB) or whether an existing bearer should be handed off to another eNB. The other eNB may have similar or different characteristics from the eNB the bearer is currently on.

In step 16, if the bearer is established on, or handed off to, an SeNB, some communication may be needed between the MeNB and the SeNB.

In step 17, MeNB sends the request to UE.

In step 18, bearer establishment signalling is exchanged between the UE and network.

In step 19 user data may flow on the established bearer(s).

Different applications may be differently sensitive or tolerant to frequent handovers. Handovers may cause a variable delay or delay fluctuation to the packet traffic of the application. The methods described above enable the selection of a suitable radio bearer and/or eNB to be used based on the characteristics of the detected application.

Figure 5:
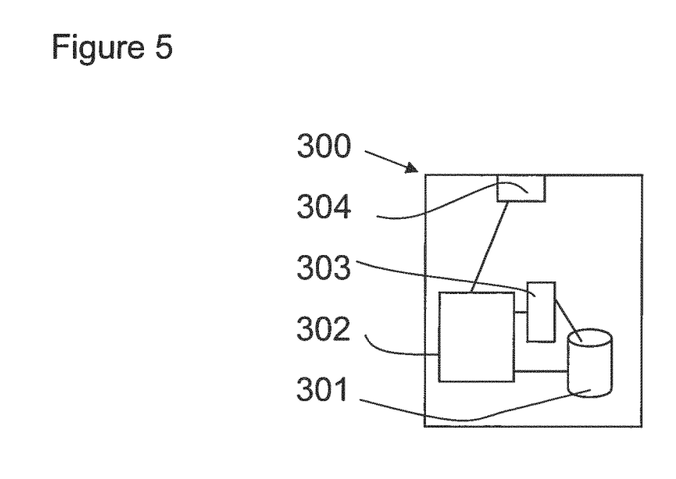
FIG. 5 shows a schematic diagram of an example control apparatus.

The method may be implemented on a control apparatus as shown in FIG. 5. The control apparatus may be integrated in the gateway entity, or any other suitable entity, or may be at least partly external. The P-GW may comprise a control apparatus such as that shown in FIG. 5. The method may be carried out across a number of entities. For example, the P-GW may comprise the PCEF and the TDF. The TDF may be a standalone node or integrated in another entity. The control apparatus can be an apparatus via which the operator can manage the network configurations. In some embodiments, each base station may have such a control apparatus as well as a control apparatus being provided in a radio network controller. The control apparatus 109 can be arranged to provide control on communications in the service area of the system. The control apparatus 109 comprises at least one memory 301, at least one data processing unit 302, 303 and an input/output interface 304. Via the interface the control apparatus can be coupled to a receiver and a transmitter of the base station. For example the control apparatus 109 can be configured to execute an appropriate software code to provide the control functions.

It is noted that whilst embodiments have been described in relation to LTE, similar principles can be applied to any other communication system where dual connectivity, or more generally connectivity where a UE may connect to more than two different cells) is supported. In particular, although dual connectivity in which a UE can connect to a MeNB and a SeNB has been referred to in the examples above, the UE may connect to base stations other than a MeNB and a SeNB. Where the term dual-connectivity is used, it can be understood to be applicable to a communication system where a UE can connect to, and communicate with, two or more cells. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
   determining a base station type on which a bearer is to be established for first traffic between a user equipment connected to a plurality of base stations and one of the plurality of base stations in dependence on information indicating the user equipment's ability to communicate with the plurality of base stations, policy rules, and information about application characteristics of said first traffic, wherein the base station type comprises a master base station and a secondary base station.

2. A method according to claim 1, comprising receiving the information indicating the user equipment's ability to communicate with a plurality of base stations.

3. A method according to claim 1 comprising
   causing the information indicating the user equipment's ability to communicate with a plurality of base stations to be sent to a first functional entity; and
   receiving the policy rules from the first functional entity, the policy rules being dependent on the information indicating the user equipment's ability to communicate with a plurality of base stations.

4. A method according to claim 1, wherein the policy rules are dependent on a user subscription profile.

5. A method according to claim 1, wherein the policy rules comprise at least one of QoS control rules and charging control rules.

6. A method according to claim 1, wherein the bearer is a dedicated non-guaranteed bit rate bearer.

7. A method according to claim 1, comprising receiving information about the application characteristics of said first traffic of said user equipment from a second functional entity.

8. A method according to claim 1, wherein the information indicating the user equipment's ability to communicate with a plurality of base stations comprises characteristics of the plurality of base stations.

9. A method according to claim 1, comprising receiving information using a bearer modification request message.

10. A method according to claim 1 comprising requesting the establishment of the bearer.

11. A method according to claim 10 comprising determining on which of the plurality of base stations the bearer should be established.

12. A method according to claim 1, wherein determining the bearer comprises determining which of an existing bearer is to be used for the first traffic.

13. A method according to claim 1 comprising causing information indicating the determined bearer to be sent to a radio network.

14. A method comprising
    receiving information indicating a user equipment's ability to communicate with a plurality of base stations;
    determining policy rules being dependent on the information indicating the user equipment's ability to communicate with a plurality of base stations dependent upon a base station type on which a bearer is to be established for first traffic between the user equipment and the plurality of base stations, wherein the base station type comprises a master base station and a secondary base station; and
    causing the policy rules to be sent to a functional entity.

15. An apparatus comprising:
    at least one processor; and
    at least one memory including computer program code, wherein the at least one memory and computer program code are configured, with the at least one processor, to cause the apparatus at least to determine a base station type on which a bearer is to be established for first traffic between a user equipment connected to a plurality of base stations and one of the plurality of base stations in dependence on information indicating the user equipment's ability to communicate with a plurality of base stations, policy rules, and information about the application characteristics of said first traffic, wherein the base station type comprises a master base station and a secondary base station.

16. An apparatus comprising:
at least one processor; and
at least one memory including computer program code,
wherein the at least one memory and computer program code are configured, with the at least one processor, to cause the apparatus at least to
receive information indicating a user equipment's ability to communicate with a plurality of base stations;
determine policy rules being dependent on the information indicating the user equipment's ability to communicate with a plurality of base stations dependent upon a base station type on which a bearer is to be established for first traffic between the user equipment and the plurality of base stations, wherein the base station type comprises a master base station and a secondary base station; and
cause the policy rules to be sent to a functional entity.

17. The method of claim 1 wherein user equipment is configured to connect to a plurality of base stations concurrently.

* * * * *